Jan. 19, 1954     J. W. BEAMS ET AL     2,666,363
TRANSMISSION LINE KERR CELL
Filed March 31, 1952
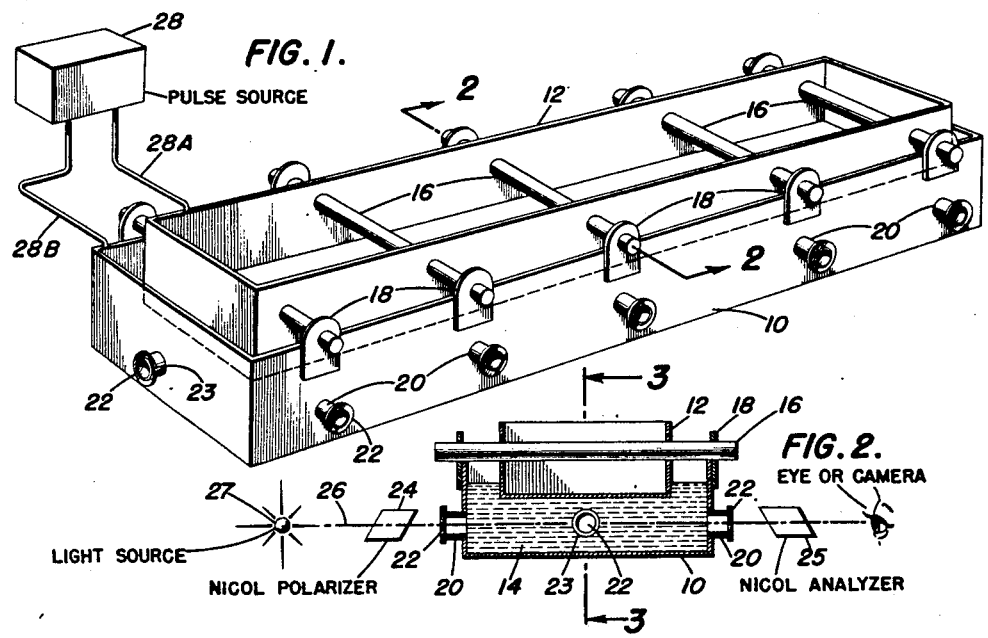
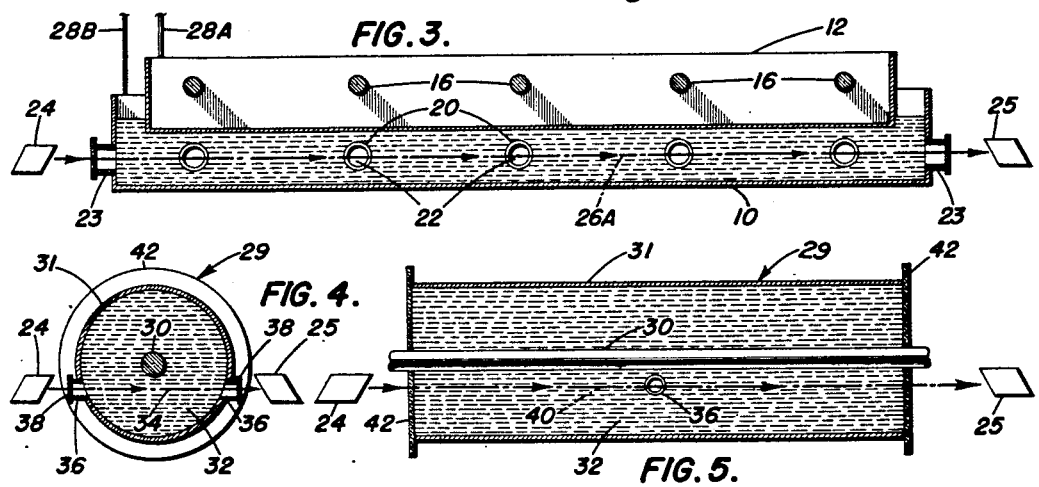
JESSE W. BEAMS
HAROLD S. MORTON, JR.
INVENTORS
ATTORNEYS Patented Jan. 19, 1954

2,666,363

UNITED STATES PATENT OFFICE 2,666,363

TRANSMISSION LINE KERR CELL

Jesse W. Beams and Harold S. Morton, Jr., Charlottesville, Va., assignors to the United States of America as represented by the Secretary of the Navy Application March 31, 1952, Serial No. 279,508

11 Claims. (Cl. 88—61)

The present invention relates generally to Kerr electro-optical cells, and more particularly to Kerr cells for modulating polarized light by electrical impulses as it passes through a liquid medium.

The Kerr cell as heretofore conventionally constructed comprises a pair of electrically conductive plates which are spaced apart and have between them a layer of an insulating liquid that is at least reasonably transparent to light rays. Usually the plates are parallel and thus define a layer of liquid of uniform thickness, so that computations of dimensions and of electrical field strength are simplified.

Plane polarized light is produced by a polarizer and is admitted through one side of such a cell. After emergence from the other side it is received by an analyzer which is "crossed" with respect to the polarizer, whereby substantially complete extinction of the emergent beam is produced when the conductive plates are electrically unchanged. For maximum effectiveness, both polarizer and analyzer are usually arranged at 45° to the plates.

When an electric field is then produced in the liquid between the plates by applying a potential difference thereto, the liquid temporarily becomes doubly-refracting and elliptic polarization replaces the formerly existing plane polarization. Extinction of the emergent beam then is no longer possible, and light is transmitted through the analyzer. The double refraction is established and destroyed with extreme rapidity upon applying and removing the electric field respectively.

A disadvantage inherent in the conventional Kerr cell is that often the effect is too small to be conveniently useful when the Kerr constant of the liquid is small. If it is attempted to remedy this defect by increasing the area of the plates, an undesirably large capacitance is simultaneously produced. On the other hand, if nitrobenzine is used as the liquid, an objectionable selective light absorption occurs due to the pale yellow color of this chemical, which becomes more intense with increasing depth of the liquid to be penetrated by the light. Moreover, nitrobenzine is chemically unstable, so that consistent results are not always attainable therewith, in spite of the fact that this substance is in other respects the best of the known suitable materials, and has the largest Kerr constant.

An object of the present invention, therefore, is to provide a Kerr cell wherein increased effects may be obtained.

Another object is to provide a Kerr cell constructed to act as a transmission line.

An additional object is to provide a Kerr cell wherein intense effects may be produced even with liquids having a relatively low Kerr constant.

A further object is to provide a Kerr cell whose width or transverse dimension may be increased to practically any reasonable extent without thereby increasing the capacitance effect of the cell.

A still further object is to provide a Kerr cell whose width may be increased to any reasonable extent without thereby changing the velocity with which an electrical impulse traverses the system that includes the cell.

An additional object is to provide a system comprising a transmission line that is impedance-matched to a conventional Kerr cell.

Other objects and many of the attendant advantages of this invention will be appreciated readily as the same becomes understood by reference to the following detailed description, when considered in connection with the accompanying drawings, wherein:

Fig. 1 is a perspective of one form of the invention;

Fig. 2 is a cross-section through the apparatus on the plane 2—2 of Fig. 1;

Fig. 3 is a longitudinal section of the invention of Fig. 1, on plane 3—3 of Fig. 2;

Fig. 4 is a cross-section of a coaxial cable employed in a modified form of the invention;

Fig. 5 is a corresponding axial section of the coaxial cable;

Fig. 6 is a diagram showing a Kerr cell connected to terminate a transmission line; and Fig. 7 is a corresponding diagram showing the Kerr cell interposed in the transmission line.

In accordance with the invention, a container for liquid medium is constructed of conductive material. This container has an optical path extending therethrough. A conductor is positioned within the container and is electrically insulated therefrom. This conductor is positioned to contact the liquid. By means of this arrangement, polarized light is modulated by a pulsing means comprising, for example, a large capacity, low impedance, double spark gap impulse generator as it passes through the liquid medium.

Referring now to Figs. 1, 2 and 3, there is shown a transmission line comprising two long conducting electrodes in the form of trays 10 and 12 insulated from each other and having a layer of a suitable liquid 14 between their opposed parallel surfaces. The outer tray 10 serves as a container for the liquid 14, while the bottom of the inner and upper tray 12 defines the upper surface of the useful portion of the liquid. The trays 10 and 12 may be kept in correct relative position by suitable supports, such as a plurality of rods 16. These rods 16 pass through tray 12, as shown, and support it. Flange members 18 on tray 10, in turn, support the rods 16. These rods are made of suitable insulating material.

While the exact type of support to be provided is immaterial, the rods 16 prove simple and effective for the desired purpose. Sufficiently numerous rods 16 should be used to prevent sagging of the upper tray 12 under its own weight, or, conversely, upward flexure due to the flotative effect of liquid 14, as it is usually convenient that the layer of liquid between the trays be of uniform thickness, to ensure a uniform electric field through the liquid.

Observation windows 20 with strain-free transparent covers 22 cemented thereon, are located in pairs opposite one another in the upright walls of the tray 10, and near enough to the bottom of tray 10 to afford a clear light path through the liquid beneath the bottom of the upper tray 12. For convenience, any optional number of such transverse pairs of windows may be provided. The covers 22 may suitably consist of microscope slide cover-glasses.

A single pair of longitudinally opposite observation windows 23 may also be provided, for use when a light beam is to pass lengthwise of the apparatus. A polarizer and an analyzer comprising Nicol prisms 24 and 25, suitably oriented, as shown in Fig. 2, are provided in the path 26 of the beam of light from light source 27. A pulse source 28, such as a large capacity, low impedance, double spark gap impulse generator, is timed to open and close the Kerr cell at the desired instant. This pulse source is connected to trays 10 and 12 through suitable leads 28A and 28B. It is to be clear, however, that the cell may be actuated by standing waves on the transmission line or by having a cell arrangement which is composed of two similar transmission lines of different length, with their fields perpendicular and discharging at the same time.

While the trays 10 and 12 are shown as relatively narrow, they may be made as wide as may be desirable or necessary in any given case. For example, if the liquid 14 in use has a low Kerr constant, a greater width of the trays is advantageous, as it counteracts the low constant as will be explained hereinafter, and this is one of the important features of the invention.

As the trays 10 and 12 are electrically insulated from each other it is possible to use them as the conductors of a transmission line. Let it be assumed that this line has a width W, that the capacitance per unit electrode area is C, and that the inductance per unit area is L. Since the capacitance is directly proportional to the area of the capacitor plates, the capacitance per unit length may be represented by WC. The inductance, however, varies inversely as the area, so that the inductance of the corresponding unit length is $$\frac{L}{W}$$

Upon taking the product of these two, $$WC \cdot \frac{L}{W}$$

is obtained. This expression reduces to LC, as the value per unit length, which is an expression independent of the width. This means that the impedance of the transmission line, which depends upon this unvarying value of the product LC, remains constant and independent of the width of the conductors of the transmission line. Therefore, the velocity of transmission of an electrical impulse through the line, which is proportional to $$\frac{1}{\sqrt{LC}}$$

is independent of the width.

This characteristic makes it possible to alter the width of the transmission line to any reasonable extent, so that when the liquid in the Kerr cell has a low Kerr constant, compensation may be provided by correspondingly increasing the length of the light path through the liquid by widening the transmission line. This was not feasible in the conventional Kerr cell built as a simple capacitor because therein the capacitance increased in direct proportion to either dimension of the cell. Since the cell was not used as a transmission line, the compensating inverse variations of the inductance were not utilized. Hence, the undesirably high capacitance resulting from increased plate size slowed the response of the cell and prevented its use where extremely rapid light control was required.

The formula governing the operation of a Kerr cell is:

$$D = \frac{2\pi l(n_p - n_s)}{\lambda} = 2\pi B l E^2$$

Herein D is the phase difference in radians, E is the voltage in electrostatic units, $\lambda$ is the wave length of the light, $l$ is the length of the light path, B is the Kerr constant and $n_p$ and $n_s$ are the refractive indices, respectively, parallel and perpendicular to the electric field.

Thus, for transverse light beams, that is, beams perpendicular to the length dimension of the transmission line, such as the one indicated by 26 in Fig. 2, the Kerr effect, in accordance with the present invention, could be built up to a useful value by a mere widening of the electrodes, without thereby slowing the response of the cell.

Longitudinal light beams, such as indicated by 26A, travelling through the pair of windows 23 and covers 22 also are useful. Here a compensation of somewhat different nature sets in, but its practical results are substantially the same. This compensation is due to the fact that within certain limits of frequency, the rate of travel of an electrical pulse along the transmission line is nearly the same as the rate of travel of light through the liquid dielectric.

For longitudinal sighting, where the line of sight is in the same direction as the travel of the electrical pulse, the velocity of the pulse is inversely proportional to the square root of the dielectric constant, while the velocity of the light is inversely proportional to the index of refraction. According to the electromagnetic theory, the square root of the dielectric constant is equal to the index of refraction in the long wave limit, and substantially equal in the range under consideration.

Consequently, for very short pulses or very short-period electrical waves, the light travels at the same speed as the wave of electrical potential, so that in certain cases the light and the electrical impulse stay approximately in phase with each other, and a cumulative, continually increasing Kerr effect, or double-refraction of the light, is secured. In this way, the attainment of a practically unlimited effect is theoretically possible, and in practice the result is limited only by purely physical considerations, such as lack of perfect transparency of the liquid, weight and bulk of the apparatus. In the above, it is assumed that the electrical impulse and the light are traveling in the same direction.

Here again the length and width of the transmission line have no objectionable effect on the speed of response of the Kerr cell. By making use of this longitudinal travel of the light, it thus becomes possible to secure a very greatly increased Kerr effect, whereby liquids that would not serve at all in the conventional Kerr cell now become usable. Thus, liquids that are exceptional in some respects or other, for example, transparent to certain spectral regions, but which have very small Kerr constants, become practical. In this way, the usefulness of the Kerr cell is increased immensely and operations in the infrared and ultraviolet regions of the spectrum become possible.

Such operations heretofore either were impossible or were severely hampered when only a few liquids having large Kerr constants were available for use. For example, nitro-benzine which was much used because of its high Kerr constant, has a light yellow color which prevents transmission of the ultraviolet end of the spectrum. Chloroform, which is transparent in this region, may now be used satisfactorily. Another generally useful liquid is that known under the trade name of "Halowax oil" and which chemically is chloronaphthalene. This is a clear colorless substance having high dielectric and insulating properties and good optical transparency.

While the transmission line above described consists essentially of two parallel plates separated by a layer of the liquid, it is not necessary that this type be used. A modified form is shown in Figs. 4 and 5, and consists of a coaxial line 29 wherein the space between the central conductor 30 and the outer tubular connecting sheath 31 is filled with a suitable liquid 32.

Referring first to Fig. 4, a coaxial cable type of Kerr cell is shown wherein the light beam 34 travels transversely and preferably nearly diametrically of the cable through liquid 32 filling the space between the central conductor 30 and the outer sheath 31 of cable 29. Observation windows 36 closed by transparent covers 38 are provided to permit passage of the polarized light beam 34. Preferably, however, the coaxial cable 36, like the transmission line described above, will be used with a light beam 40 traveling longitudinally of the cable, as shown in Fig. 5, to secure the advantages of a long path in the liquid. The ends of the coaxial cable 29 are closed by transparent covers 42 which permit the light beam 40 to pass and which prevent leakage of the liquid 32.

A further embodiment of the invention, shown in Fig. 6, resides in the possibility of using an ordinary conventional Kerr cell 44 of proper transverse dimension, in combination with a transmission line 46 of any kind, here shown as a coaxial cable, the cell forming a terminus of the line. To accomplish this successfully, the transmission line 46 and the cell 44 should be impedance-matched to each other. The advantage of this embodiment is that a small amount of a scarce liquid will suffice for the relatively small cell, or economy of space may be secured by not requiring a long Kerr cell, or both advantages jointly may be attained in some cases. A further advantage resides in the possibility of utilizing an already existing transmission line as part of the apparatus.

Finally, Fig. 7 shows a Kerr cell 48 interposed in a transmission line 50, in what may be considered series relationship to the line. When properly impedance-matched to the line, the cell thus becomes in effect a part of the line, and provided such matching exists, the dimension of the cell transverse to the line may be as great as is desired, thereby securing the advantages already discussed.

The improved Kerr cell has many uses based mainly on its large and extremely fast response to electrical potentials. Since the optical effect commences and ceases almost instantaneously in step with the potentials, a very short electrical pulse will provide a correspondingly short light flash through the cell, which may be used in numerous ways. Thus, the invention is applicable to use in stroboscopy, in stop-motion photography for rapid phenomena, such as combustion, explosions, tests of electrical breakdown, electrical spark characteristics, fast-moving projectiles, supersonic phenomena, particularly in wind tunnels, schlieren photography and many other purposes that will readily suggest themselves.

The increased Kerr effect produced by the widened cell or the longitudinal transversing of a long transmission line serves to make the improved Kerr cell adequate for many of the above and other purposes for which the conventional cell was not suited, because of some or all of its limitations previously pointed out herein.

Obviously many modifications and variations of the present invention are possible in the light of the above teachings. It is therefore to be understood that within the scope of the appended claims the invention may be practiced otherwise than as specifically described.

What is claimed is:

1. An electro-optical cell for modulating polarized light by electrical impulses as it passes through a liquid medium, comprising, an outer container for said liquid, said container being formed of conductive material and having light apertures formed therein so that an optical path can extend through said container and said liquid, a conductor positioned within said container and insulated therefrom, said conductor being positioned to contact said liquid, and pulsing means electrically connected to said container and said conductor.

2. An electro-optical cell for modulating polarized light by electrical impulses as it passes through a liquid medium, comprising, an outer container for said liquid, said container being formed of conductive material and having light apertures formed therein so that an optical path can extend through said container and said liquid, conducting means positioned within said container and insulated therefrom, said conducting means being positioned to contact said liquid, and pulsing means electrically connected to said container and said conducting means.

3. An electro-optical cell for modulating a polarized light beam by electrical impulses as it passes through a liquid medium, comprising, means for containing said liquid, said containing means being formed of conductive material and having light apertures formed therein so that an optical path can extend through said containing means and said liquid, conducting means positioned within said containing means and insulated therefrom, said conducting means being positioned to contact said liquid medium, and pulsing means electrically connected to said containing means and conducting means.

4. An electro-optical transmission line, comprising, two conducting electrodes, one of said electrodes having light apertures formed therein, said electrodes being electrically insulated from each other, a layer of liquid medium between said electrodes and having an optical path extending therethrough and through said apertures, a source to project polarized light through said apertures and said liquid medium, and pulsing means electrically connected to said electrodes.

5. An arrangement as set forth in claim 4, wherein said conducting electrodes are in the form of trays, said trays having their respective surfaces substantially parallel to each other.

6. An arrangement as set forth in claim 4, wherein said conducting electrodes comprise a coaxial line consisting of an outer tubular sheath and a central conductor, with said outer tubular sheath being filled with the liquid.

7. A system for terminating a transmission line including a pair of conducting elements, comprising, a pair of conducting electrodes electrically connected to said conducting elements of said transmission line, one of said electrodes having light apertures formed therein, said electrodes being electrically insulated from each other, a liquid medium between said electrodes and in contact therewith, a source to project polarized light through said apertures and said liquid medium, and pulsing means electrically connected to the conducting electrodes.

8. In combination, a transmission line, and an electro-optical system connected with said transmission line, said system comprising a container having light apertures formed therein, a liquid medium in said container, said container being formed of conductive material and having an optical path extending through said apertures and said liquid medium, conducting means positioned within said container and insulated therefrom, said conducting means being positioned to contact said liquid, said container and said conducting means being electrically connected to said transmission line, said cell system and said transmission line being impedance-matched to each other, a source to project polarized light through said light apertures and said liquid medium along said optical path, and pulsing means associated with said transmission line.

9. In combination, a transmission line and an electro-optical cell system comprising a container having light apertures formed therein, a liquid medium in said container, said container being formed of conductive material and having an optical path extending through said apertures and said medium, conducting means positioned within said container and insulated therefrom, said conducting means being positioned to contact said liquid medium, said container and said conducting means being in electrical cooperation and impedance-matched with said transmission line, a source to project polarized light through said light apertures and said liquid medium along said optical path, and a pulse source electrically connected to said transmission line and said cell system.

10. A cell light shutter arrangement, comprising, conducting means for containing a liquid medium, said means having light apertures formed therein, a conductor in contact with said liquid medium, said conducting means and said conductor being electrically insulated from each other, a source to project polarized light through said apertures and said liquid medium, and a source of electrical impulses impressed on said conducting means and conductor.

11. An arrangement as set forth in claim 10, wherein said liquid medium comprises nitrobenzine.

JESSE W. BEAMS.
HAROLD S. MORTON, Jr.

References Cited in the file of this patent

UNITED STATES PATENTS

| Number | Name | Date |
|---|---|---|
| 1,788,470 | Nyquist | Jan. 13, 1931 |
| 1,872,675 | Case | Aug. 23, 1932 |
| 1,880,102 | Meissner | Sept. 27, 1932 |
| 2,147,693 | Dowsett | Feb. 21, 1939 |
| 2,163,549 | Clothier | June 20, 1939 |
| 2,163,550 | Clothier | June 20, 1939 |
| 2,163,551 | Clothier | June 20, 1939 |

Certificate of Correction

Patent No. 2,666,863                                                January 19, 1954

Jesse W. Beams et al.

It is hereby certified that error appears in the printed specification of the above numbered patent requiring correction as follows:

Column 1, lines 21 and 22, for "unchanged" read *uncharged*; column 5, line 46, for "connecting" read *conducting*;

and that the said Letters Patent should be read as corrected above, so that the same may conform to the record of the case in the Patent Office.

Signed and sealed this 4th day of May, A. D. 1954.

[SEAL]

ARTHUR W. CROCKER,
*Assistant Commissioner of Patents.*